United States Patent Office 3,591,649
Patented July 6, 1971

3,591,649
CONVERSION CATALYST
Wolfram R. Kroll, Linden, and George W. Dembinski, West Orange, N.J., assignors to Esso Research and Engineering Company
No Drawing. Filed Oct. 10, 1968, Ser. No. 766,651
Int. Cl. C07c 5/10; B01j 11/22
U.S. Cl. 260—667                                   22 Claims

ABSTRACT OF THE DISCLOSURE

An activated conversion catalyst may be prepared by a unique processing sequence. In this sequence a conventional supported transition metal catalyst is brought to substantially improved levels of activity by impregnation with a reduced transition metal catalyst, capable of activating molecular hydrogen.

FIELD OF INVENTION

This invention relates to the preparation and use of novel heterogeneous conversion catalysts which are useful in the conversion of organic feed streams in the presence of hydrogen. Examples of such conversions include the hydrogenation of organic compounds having nitrile groups, carbonyl groups, aromatic, acetylenic or olefinic linkages. More particularly, this invention relates to the preparation and use of a novel heterogeneous catalyst which comprises a supported transition metal oxide impregnated with a reduced transition metal catalyst which is capable of activating molecular hydrogen. In a preferred embodiment of this invention, the impregnation may be accomplished by treating the supported transition metal oxide catalyst with a non-aqueous solution containing a transition metal organic complex in an inert atmosphere. The solvent is then removed by means of evaporation and drying. Following the removal, the catalyst is activated by reduction at elevated temperature.

PRIOR ART

It is known in the art to make use of supported transition metals, including the noble metals, as catalysts for conducting chemical reactions in the presence of hydrogen. Supported transition metal oxide catalysts such as nickel oxide on alumina or nickel oxide on silica have been especially important. These catalysts have been prepared in the past by impregnating a support with a salt solution of the desired metal, followed by reduction of the salt, in a reducing atmosphere, i.e. hydrogen atmosphere at a temperature usually up to about 900° C. Hydrogen reduction, which serves to activate the catalyst, has presented serious problems in the past. The elevated temperatures utilized often caused sintering of the support material in addition to severe reduction of the surface area of the support, a fact well known by those skilled in the art. As a result, the catalysts produced have tended to rapidly lose activity.

Furthermore, certain transition metal oxides such as supported cobalt and iron have been very difficult to reduce. In fact, it is known in the art that supported iron oxide catalysts possess substantially no catalytic activity for the hydrogenation of benzene.

A further problem is encountered if water solutions are employed to impregnate the transition metal oxide onto the support. A separate calcining operation is needed which may also lead to the same reduced surface area problem discussed above. Thus, a need exists for a process which will alleviate the problems associated with traditional high temperature activation of supported transition metal oxide catalysts.

It has now been discovered that by means of a unique processing scheme highly active transition metal oxide supported catalysts can be created. The creation of these catalysts, according to the instant invention, does not require the high temperature activation procedure which in the past has led to the undesired sintering of the catalyst support.

SUMMARY OF THE INVENTION

According to this invention, it has unexpectedly been found that a highly active transition metal oxide supported catalyst will result if such a catalyst in contact with a reduced transition metal capable of activating molecular hydrogen is heated in the presence of a reducing gas such as hydrogen. There are a variety of ways to generate or to deposit an activator of a supported transition metal oxide. One method uses as activator an in situ prepared reduced transition metal. Such in situ prepared reduced transition metals can be obtained by different methods. For example, one can prepare a homogeneous solution of a reduced transition metal by reacting transition metal salts or chelates with a metal alkyl, metal hydride or complex metal hydride reducing agent. Such a solution can then be used for the impregnation of a supported transition metal oxide.

Another method consists of impregnating a supported transition metal oxide with a solution of a transition metal compound which is subsequently reduced at moderate temperatures using e.g. a metal alkyl, metal hydride or complex metal hydride reducing agent.

A third method utilizes for the impregnation step as activator zero valent transition metal compounds that can activate molecular hydrogen, e.g. dicobalt-octacarbonyl.

Additionally, transition metal compounds having at least one metal-carbon bond as e.g. transition metal alkyls, aryls, allyl complexes or π-bonded metal olefin complexes may be used. Upon contact with hydrogen at room or elevated temperatures these compounds decompose with formation of the actual activator. Other activators include transition metal mono- and dihydrides. The preferred method for impregnating the supported transition metal oxide entails the use of a solution, non-aqueous in nature, containing a reduced transition metal organic complex catalyst. The solution is deposited on the transition metal oxide and the solvent removed. The transition metal must be capable of activating molecular hydrogen. Generally, small amounts of such soluble, reduced activator are sufficient. Therefore, the atomic ratio of transition metal activator to supported transition metal oxide is usually smaller than 20 to 100 and can be 0.01 to 100.

Following the impregnation which takes place at a temperature of ambient to 300° C. and a pressure of subatmospheric to 150 p.s.i.g. the solvent is removed from the catalyst. This removal is effected by stripping in vacuo or atmospheric pressure at ambient or elevated temperature. The catalyst is then activated by reduction at temperatures of ambient to 800° C., preferably 100 to 500° C. for a period of 30 to 300 minutes, preferably 60 to 120 minutes. The catalyst is now activated and may be used for any of the various hydrogenation reactions.

It is hypothesized that the reduced transition metal (activator) would sufficiently activate the molecular hydrogen during the reduction, followed by a migration of the active hydrogen to a transition metal oxide site where the reduction of the metal oxide would proceed at substantially lower temperatures than required in the past.

In essence the reduced transition metal serves to accept and activate the molecular hydrogen, the support serves to transport the activated hydrogen and the transition metal oxide accepts the activated hydrogen and is reduced by it to the finely divided metal and water which is constantly removed by the reducing gas.

While not intending to be bound by any particular theory, it is believed that the catalyst of the instant invention may be an alloy since on occasion an unusual synergistic effect has been observed. The activity of the catalyst is often in excess of the activity of the various individual catalytic elements.

The novel conversion catalyst prepared by the process of the instant invention is useful as a hydrogenation catalyst. The catalyst, however, may also be utilized to promote such other conversions as dehydrogenation, reforming isomerization, hydrocracking, desulfurization, aromatization, dimerization, Fischer-Tropsch synthesis, ammonia synthesis, olefin disproportionation as well as the selective hydrogenation reactions, such as removal of acetylenes and dienes from mono-olefinic or aromatic feedstreams.

The transition metal activators of this invention are selected from Group VIII of the Periodic Chart of Elements. Especially preferred transition metals to be used as activators are cobalt, iron, nickel, platinum, rhodium. Regarding the transition metal oxide element of the supported catalyst, cobalt oxide and iron oxide are especially preferred. In particular, iron oxide on a support, may be raised to a high level of catalytic activity by using the process of the instant invention.

Broadly, supported transition metal oxides wherein the metal may typically be titanium, zirconium, vanadium, chromium, molybdenum, tungsten, manganese, iron, cobalt, nickel as well as the platinum group metals may be employed. As a group, the preferred metals are those categorized as Group VIII base metals, although Groups IV-B and VII-B are applicable.

The requirements for the activator are as follows: it has to possess at least one transition metal; it has to be able to activate molecular hydrogen at low or moderate temperatures and low pressures. Generally reduced transition metal compounds can fulfill this requirement. To this group belong well defined transition metal complexes possessing $\sigma$ bonded or $\pi$-bonded organic groups as well as complex transition metal mono- and dihydrides. The organic constituent of the organo-metallic complex by means of which the transition metal is added to the supported catalyst may be alkyl, aryl, alkaryl, aralkyl, cycloalkyl, allyl, cyclomatic. Such groups incude, for example, methyl, ethyl, n-propyl, isopropyl, isobutyl, sec-butyl, tert-butyl, n-amyl, isoamyl, heptyl, n-octyl, n-dodecyl, and the like; 2-butenyl, and the like, cyclopentyl-methyl, cyclohexyl-ethyl, cyclohexylpropyl, and the like; 2-phenyl ethyl, 2-phenyl propyl, 2-naphthyl ethyl, and the like; cyclopentyl, cyclohexyl, 2,2,1-bicycloheptyl, and the like; methyl cyclopentyl, methyl-cyclopentadienyl, ethyl cycopentyl, methyl cyclohexyl, dimethyl cyclohexyl, 5-cyclopentadienyl, allyl, and the like; phenyl cyclopentyl, and the like; phenyl, tolyl, xylyl, ethyl phenyl, naphthyl, cyclohexyl phenyl, and the like. In general, the organic constituent group can contain up to about 20 carbon atoms.

Another group of activators comprises the transition metal carbonyls and their derivatives, e.g. hydrocarbonyls, cyclopentadienylcarbonyls and other substituted derivatives.

Finally, there is a large group of activators which are prepared in situ and which are not very well defined. To these belong the reduced transition metal complexes that are obtained upon reaction of metal alkyls, metal hydrides and complex metal hydrides with transition metal compounds including the transition metal chelates. Some of these complexes—especially those prepared by reduction with organo-aluminum compounds—are highly active as activators of molecular hydrogen and represent excellent activators for the conventional or commercial supported catalysts. Generally, these complexes have sufficient solubility in aromatics and can be easily prepared from commercially available starting materials.

It is essential that the transition metal organic complex be added to the supported transition metal oxide catalyst in an inert atmosphere which can be any gas that does not destroy the activator as e.g. argon, nitrogen, helium, methane, ethane and hydrogen.

The solvent in which the transition metal organic catalyst is added to the supported transition metal oxide may be any of a variety of solvents which are generally characterized as non-aqueous organic solvents. Both polar and non-polar solvents may be utilized but it is important that they do not destroy the activator. Among the solvents that may be employed are included ethers such as diethylether, dioxane, tetrahydrofuran, ketones such as acetone; organic halides, such as methyl chloride, ethyl chloride, chloroform, dichloromethane; as well as paraffins, cycloparaffins and isoparaffins as exemplified by pentane, hexane, isooctane, decane, dodecane and the like. In similar fashion aromatics ranging from $C_6$ through $C_{20}$ may be similarly employed. This category would include benzene, xylene, toluene and durene. Also, partially hydrogenated aromatics such as cyclohexene, tetraline may be employed. The most preferred solvents, however, would be the $C_5$–$C_{20}$ paraffins, normal, branched and cyclic, and the aromatics.

The supports applicable to this invention include commonly used carriers as: alumina, silica, carbon as well as less commonly used carriers as magnesium oxide, cerium oxide, calcium oxide, barium carbonate, boron oxide, lanthanum oxide, indium oxide, boron nitride, silicon carbide, alkali-doped alumina. Suitable supports are the oxides of Groups II, III, IV, V, and VI-B metals of the Periodic Chart of the Elements. The preferred supports are the oxides of Groups II, III-A and IV-B metals. These would include zinc oxide, magnesium oxide, calcium oxide, strontium oxide and barium oxide. The most preferred metal oxides are those which fall into Groups III-A and IV-A, particularly alumina and silica. Alumina and silica supports are the most common and because of their availability will usually be the most preferred. Combination supports such as silica alumina may also be used effectively and they too are preferred. In addition, naturally occurring materials such as clays, diatomaceous earths, activated carbon, coal, graphite and the various molecular sieves can be used, too.

The method used to deposit the transition metal onto the supported transition metal oxide catalysts is not critical. The most preferred technique, however, requires that a non-aqueous solution containing a complex of a transition metal organic complex is contacted, in an inert atmosphere, e.g. hydrogen, nitrogen, the rare gases, methane and other gases that do not destroy the activating function of the reduced transition metal compound, with a supported transition metal oxide. The contacting takes place at a temperature of ambient to 300° C. at a pressure of subatmospheric to 150 p.s.i.g. The catalyst is in the form of a homogeneous solution or a slurry. This contacting should take place for at least about 30 minutes. The excess solvent is then driven off by heating to a temperature of about ambient to 300° C., at atmospheric pressure or by a vacuum. Alternatively, a combination of both may be used. The length of time of the reaction will depend on temperature with less time being required at higher temperatures.

It is generally not necessary to insure removal of all excess solvent unless polar solvents are employed since they can serve to reduce the activity of the catalyst.

At this point the catalyst is heated in a reducing atmosphere in order to activate it. Temperatures of ambient to 600° C. are utilized to activate the catalyst. In the past, temperatures of 300 to 800° C. were needed to activate similar supported catalysts. Additionally, a gas flow, in the amount of 1 to 1000 v./v./hr. is passed over the catalyst for a period of 30 to 300 minutes. The gas used can be a reducing gas like e.g. hydrogen, carbon monoxide or a mixture of a reducing gas with an inert gas. It is of advantage to use an excess of reducing gas to speed up the activation and to keep the surface clean.

The catalyst described herein may be characterized as useful for promoting the conversion of organic compounds in admixture with hydrogen. Such conversions may result in a net consumption of hydrogen such as in ammonia synthesis or hydrogenation. Alternatively, there may be a net production of hydrogen such as is found in dehydrogenation; there may also be no net change in hydrogen such as in those reactions wherein hydrogen is only a diluent as characterized by isomerization. The catalyst may be used as slurry, fixed bed, a movable bed or a fluidized bed. It will find use in both liquid phase and vapor phase reactions whether batch, continuous or staged. The catalyst may be used as powder, granules as well as tablets.

Hydrogenation reactions are normally conducted at elevated temperatures and elevated pressures. With the instant catalyst, hydrogenation reactions can be effected more successfully at lower temperatures and lower pressures. Pressures for hydrogenation reactions with the activated catalysts will vary from atmospheric to 5000 p.s.i.g. The catalyst is generally present in amounts of about at least 0.01 to about 60% in batch runs based on weight of feed.

Generally, any organic compound capable of being reduced by hydrogen may be hydrogenated with the catalyst. More specifically, the catalyst disclosed herein may be used to hydrogenate nitrile, carbonyls, olefinic, aromatic and acetylenic compounds. It may also be used to hydrogenate carbon monoxide to methane and nitrogen to ammonia. Typical examples of compounds which may be hydrogenated with the instant catalyst are aromatics, nitriles, aldehydes, ketones and esters. Generally, these compounds have up to 40 carbon atoms. The preferred aliphatic compounds have from 2 to 20 carbon atoms, they may be cyclic, branched or normal. The preferred aromatic compounds which may be hydrogenated by the instant invention have from 6 to 20 carbon atoms, more preferably 6 to 12 carbon atoms.

Examples of other conversion processes in which hydrogen is admixed with the feed and conversion may be promoted by the instant catalyst are: vapor phase dehydrogenation wherein the hydrogen introduced with the feed stream can vary from less than a 1:1 molar ratio based on feed upward to a 10:1 to 30:1 molar ratio based on feed, temperatures are generally in excess of 300° C., preferably 350–550° C. and hydrogen pressures range from about atmospheric to about 150 p.s.i. Usually the hydrogen flow rate is about 0.1 to 20 v./v./hr. A typical example of dehydrogenation in the presence of hydrogen is shown in U.S. Pat. 3,293,319. The conditions and procedures stated therein can readily be employed with catalysts disclosed herein; isomerization of $C_5$–$C_{20}$ paraffins, e.g., n-hexane, at temperatures of about 100°–400° C. and hydrogen pressures ranging from about atmospheric to 500 p.s.i. generally in an inert solvent; vapor phase catalytic ammonia synthesis by reaction of nitrogen and hydrogen at temperatures of about room temperature to 550° C. and pressures ranging from about 100–5000 p.s.i.; reforming of, for example, steam cracked naphthas, kerosene fractions, etc. to obtain improved octane ratings at temperatures of about 400–500° C. and hydrogen pressures ranging from about 100–500 p.s.i. The foregoing processes are all carried out under conventional conditions in conventional apparatus and one skilled in the art, knowing the various reactions that may be effected with these novel catalysts, will readily determine the proper feeds and reaction conditions for optimum conversions.

PREFERRED EMBODIMENTS

The invention is further illustrated by the following examples, however, no limitations are to be implied from these examples since variations and modifications will be obvious to those skilled in the art.

In the following examples the commercial catalyst and carriers used were all broken down to a mesh size of 8 through 12 and subsequently dried in high vacuum of $10^{-4}$ mm. Hg at 300° C. The tests in all examples consist of the hydrogenation of benzene to cyclohexane at 100° C., a $H_2$ pressure of atmospheric, a $H_2$ flow rate of 3400 ml./min., liquid feed flow rate of 46.9 ml./hr. with a feed of a molar solution of benzene in hexane. The percent conversion of benzene to cyclohexane was used as the measure of the catalyst activity.

EXAMPLE 1

In this example the activity of a transition metal oxide supported catalyst was compared with a transition metal oxide supported catalyst which was impregnated with reduced nickel complex as activator. It was prepared by reducing nickel-acetylacetonate with tri-isobutylaluminum (atomic ratio Ni:Al=1:4) in benzene. The amount of activator was 10 atom percent of the supported nickel oxide.

In this preparation 8.7 g. of the catalyst was impregnated with a solution which was obtained by reacting 20 ml. of a 0.1 molar solution of tri-isobutylaluminum with 0.5 millimole of nickel (II) acetylacetonate in benzene. After standing for two hours the solvent was removed in vacuo using a rotary evaporator at 0.5 mm. Hg and ambient temperature. The supported metal oxide was a commercial catalyst containing 3.4% by wt. Ni as Ni oxide on alumina.

The activity level of the two catalysts, impregnated and non-impregnated, was then compared. Five grams of each catalyst were treated with 3.4 liters/hr. of hydrogen at a temperature of 200° C. for two hours, then cooled to 100° C. and subjected to a standard benzene hydrogenation test as mentioned above. Subsequently, the reduction was continued for the same time period at a temperature 100° C. higher, i.e. 300° C., followed by an identical benzene hydrogenation test at 100° C. Table I below indicates the results which were achieved.

TABLE I

|  | Reduction temp. (° C.) | Percent conversion of benzene to cyclohexane | |
|---|---|---|---|
|  |  | Ni/$Al_2O_3$ | Activated Ni/$Al_2O_3$ |
| Run No.: |  |  |  |
| 1 | 200 | 0 | 16.9 |
| 2 | 300 | 0 | 9.1 |

The standard, non-impregnated catalyst showed no activity at all. The impregnated catalyst showed an activity level of 16.9 for the reduction at 200° C. and 9.1 at 300° C. This represents a substantial improvement over a standard, non-impregnated catalyst.

EXAMPLE 2

In this example a commercial cobalt on silica catalyst, containing 7.05% by weight cobalt as cobalt oxide on silica, was used as the standard, non-impregnated catalyst. This same catalyst was then impregnated with a soluble cobalt catalyst which had been prepared similarly to Example 1 by reduction of cobalt (II) acetylacetonate with tri-isobutylaluminum (atomic ratio Co:Al=1:4). Again the amount of activator was 10 atom percent cobalt of the cobalt oxide on silica. In the catalyst preparation 4.2 g. of the commercial catalyst was contacted for two hours with a solution which had been obtained by reacting 2.5 ml. of an 0.2 molar solution of cobalt (II) acetylacetonate in benzene with 20 ml. of an 0.1 molar solution of tri-isobutyl-aluminum in benzene. Subsequently, the solvent was stripped in vacuo as described in Example 1. The two catalysts were then reduced as in Example 1 and the following results were observed.

TABLE III

| Run No.: | Reduction temp., °C. | Conversion of benzene to cyclohexane (percent) | |
|---|---|---|---|
| | | Co/SiO$_2$ | Activated Co/SiO$_2$ |
| 1 | 100 | 0 | 5.2 |
| 2 | 200 | 13.5 | 50.4 |
| 3 | 300 | 53.0 | 75.7 |

The data in the above tables indicate that at 100° C. reduction temperature, the impregnated catalyst has activity whereas the ordinary, non-impregnated catalyst does not. At 200° C. the impregnated catalyst is almost 5 times as active as the ordinary catalyst. A substantial activity difference in favor of the impregnated catalyst is also noted at 300° C.

EXAMPLE 3

In this example, the same commercial cobalt on silica catalyst of Example 2 was compared with an activated cobalt catalyst which was obtained by impregnation of 4.2 g. of the commercial cobalt catalyst with a benzene solution of a reduced nickel complex which was obtained by reacting 0.5 millimole of nickel (II) acetylacetonate with 20 milliliters of an 0.1 molar solution of tri-isobutylaluminum in benzene at ambient temperature over a period period of 2 hours. Subsequently, the solvent was removed in vacuo as described in the previous examples.

The same reduction conditions as in Examples 1 and 2 were utilized with the following results.

TABLE III

| Run No.: | Reduction temp., °C. | Conversion of benzene to cyclohexane (percent) | |
|---|---|---|---|
| | | Co/SiO$_2$ | Activated Co/SiO$_2$ |
| 1 | 100 | 0 | 19.1 |
| 2 | 200 | 13.5 | 89.9 |
| 3 | 300 | 53.0 | 92.5 |

Here the improvement is strikingly demonstrated. After reduction at 100° C. the impregnated catalyst produced a 19.1% conversion of benzene to cyclohexane; no conversion was effected with the standard catalyst. Again at the 200° C. reduction temperature the difference between the impregnated catalyst and the standard one was most apparent; at this temperature the impregnated catalyst was almost 7 times as effective in converting benzene to cyclohexane.

EXAMPLE 4

This example illustrates a very substantial improvement in the art. Traditionally, supported iron oxide had been recognized as having little or no ability for hydrogenation reactions. In this example a commercial catalyst containing 3.72% by weight iron as iron oxide on alumina was compared to the same catalyst which had been activated by impregnating with a soluble, reduced cobalt catalyst. This impregnation took place as follows. A soluble reduced cobalt catalyst was prepared by reducing cobalt (III) acetylacetonate 0.5 millimole with tri - isobutylaluminum in benzene (atomic ratio Co:Al=1:4) analogous to Example 2. To this benzene solution of the activator was added 7.53 g. of the supported iron catalyst and allowed to stand for two hours. The subsequent removal of the solvent was analogous to the previous examples. Again the atomic ratio of supported transition metal oxide to soluble cobalt activator was 10:1. After reduction of the catalyst, as in the previous examples, the following results were observed.

TABLE IV

| Run No.: | Reduction temp. (°C.) | Conversion of benzene to cyclohexane (percent) | |
|---|---|---|---|
| | | Fe/Al$_2$O$_3$ | Activated Fe/Al$_2$O$_3$ |
| 1 | 200 | 0 | 0.3 |
| 2 | 300 | Trace | 17.0 |
| 3 | 400 | 0.1 | 31.4 |
| 4 | 500 | 0 | 63.4 |

From the above table one may readily observe that the standard commercial catalyst is inactive as a means for hydrogenating benzene. In opposite fashion, the impregnated catalyst shows a strong ability to convert benzene to cyclohexane particularly after reduction at 500° C. Thus, a significant break-through has been achieved; a cobalt-impregnated iron oxide on alumina catalyst was successfully demonstrated as an active, stable hydrogenation catalyst. In a parallel experiment the soluble cobalt activator was deposited on a similar alumina and then subjected to the same reduction and test procedure. The tests showed only marginal hydrogenation activity thus confirming that the activity of the catalyst components is negligible.

EXAMPLE 5

This example shows the activation of the same commercial iron oxide on alumina catalyst as in the previous example with a soluble reduced iron catalyst as activator. The soluble iron catalyst was prepared by reacting iron (III) acetylacetonate (0.5 millimole) with tri-isobutylaluminum in benzene (atomic ratio iron to aluminum 1:4). To this benzene solution of the soluble iron activator was added 7.53 g. of the commercial iron oxide catalyst on alumina. After two hours contacting time the solvent was removed as described in the previous examples. Again the atomic ratio of iron oxide to soluble reduced iron activator is 10:1. The following results were obtained in the hydrogenation of benzene.

TABLE V

[Activation of commercial iron catalyst with a soluble, reduced iron catalyst. Comparison of activity in the hydrogenation of benzene at 100° C. and atmospheric hydrogen pressure]

| Reduction temp. (°C.) | Conversion of benzene to cyclohexane (percent) | |
|---|---|---|
| | Fe/Al$_2$O$_3$* | Activated Fe/Al$_2$O$_3$** |
| 200 | 0 | 0 |
| 300 | Trace | Trace |
| 400 | 0.1 | 5.8 |
| 500 | 0 | 6.9 |

* 3.72% Fe/Al$_2$O$_3$ catalyst.
** Same catalyst, activated with 10 atom percent soluble, reduced iron catalyst in benzene.

Here, again, the performance of the iron activator on alumina was tested in separate runs. Similar results were obtained as in Example 4. The contributions of the activator on alumina after hydrogen treatment at 300–500° C. for benzene hydrogenation are zero.

EXAMPLE 6

This example demonstrates that different types of activators may be used. In this case a transition metal carbonyl is used. 20 g. of a commercial iron oxide on alumina catalyst containing 20% Fe$_2$O$_3$ were impregnated with 0.428 g. dicobaltoctacarbonyl in benzene as in Example 1. The reduction of 5 g. of this preparation was carried out with hydrogen at 400° C. over 1 hour followed by a benzene hydrogenation test at 100° C. With this preparation 30.6% conversion to cyclohexane was achieved whereas the iron oxide on alumina without activator showed no conversion at all.

EXAMPLE 7

The same commercial iron catalyst (20 g.) as used in Example 6 was impregnated with 0.098 g. platinum (II) acetylacetonate in 30 ml. dichloromethane. After solvent removal the catalyst was reduced at 400° C. for 1 hour, and tested in the standard benzene hydrogenation. Subsequently, another catalyst was made up using the same amount of supported iron oxide and platinum chelate. However, in this case after the solvent removal it was reacted with 0.072 g. trimethylaluminum in 30 ml. pentane. By adding the trimethylaluminum the activator was produced in situ on the surface. Again this catalyst was hydrogen reduced at 400° C. and tested by the standard benzene hydrogenation test.

TABLE VII

Conversion to cyclohexane percent

| | |
|---|---|
| Reduction Temp. (° C.) | 400 |
| Without platinum activator | 4.7 |
| With platinum activator | 12.1 |

The activation method used here is different from the one used in the other examples. In this case a non-reduced transition metal is deposited on the commercial catalyst which is then converted into an activator for molecular hydrogen by reaction with an organometallic reducing agent, in this case trimethylaluminum. Again the activated catalyst was substantially more effective.

What is claimed is:

1. A process for preparing a catalyst for the conversion of organic compounds which comprises impregnating a supported transition metal oxide with a reduced transition metal, said reduced transition metal selected from the group consisting of Group VIII metals and activating said catalyst by heating in the presence of a reducing gas.

2. The product of claim 1.

3. The process of claim 1 wherein said impregnation is effected by contacting said supported metal oxide in an inert atmosphere with a non-aqueous solution comprising a reduced transition metal organic complex, said transition metal selected from the group consisting of Group VIII metals in an organic solvent and removing excess solvent from said catalyst.

4. The process of claim 3 wherein said reduced transition metal is cobalt.

5. The process of claim 3 wherein said reduced transition metal is nickel.

6. The process of claim 3 wherein said reduced transition metal is iron.

7. The process of claim 3 wherein said support is a silica containing support.

8. The process of claim 3 wherein said transistion metal oxide is selected from the group consisting of Groups IV-B through VII-B and Group VIII metal oxides.

9. A process for preparing a catalyst for the conversion of organic compounds in the presence of hydrogen which comprises contacting a solution comprising an organo metallic complex, the metallic element of which is selected from the group consisting of reduced Group VIII transition metals, in a substantially anhydrous organic solvent with a suported transition metal oxide, said transition metal oxide selected from the group consisting of Groups IV-B through VII-B and VIII metals under impregnating conditions whereby said Group VIII transition metal is impregnated onto said supported metal oxide and heating said impregnated catalyst in the presence of a reducing gas whereby said catalyst is activated.

10. The product of claim 9.

11. The process of claim 9 wherein said contacting takes place at a temperature of ambient to 300° C.

12. The process of claim 9 wherein said impregnated catalyst is activated by heating to a maximum of about 600° C.

13. The process of claim 9 wherein said support comprises an element selected from the group consisting of Groups II through VII elements.

14. The process of claim 9 wherein excess solvent is removed prior to activating said catalyst.

15. The process of claim 9 wherein said reduced transition metal is cobalt.

16. The process of claim 9 wherein said reduced transition metal is iron.

17. The process of claim 9 wherein said reduced transition metal is nickel.

18. The process of claim 9 wherein said solvent is selected from the group consisting of $C_5$ through $C_{20}$ paraffins, and $C_6$ through $C_{20}$ aromatics.

19. The product of claim 14.

20. In an improved process for the conversion of aromatic hydrocarbons in the presence of hydrogen, the improvement which comprises contacting said aromatic hydrocarbon under reaction conditions with the product of claim 19.

21. The process of claim 20 wherein the conversion process is hydrogenation.

22. A process for preparing a catalyst for the conversion of organic compounds in the presence of hydrogen which comprises contacting a solution comprising an organo metallic complex, the metallic element of which is selected from the group consisting of reduced Group VIII transition metals, in a substantially anhydrous organic solvent with a supported transition metal oxide, said transistion metal oxide selected from the group consisting of Group VIII metals, under impregnating conditions, whereby said Group VIII transition metal is impregnated onto said supported metal oxide and heating said impregnated catalyst in the presence of a reducing gas whereby said catalyst is activated.

References Cited

UNITED STATES PATENTS

| | | | |
|---|---|---|---|
| 3,409,681 | 11/1968 | Kroll | 260—683.9X |
| 3,461,181 | 8/1969 | Sato et al. | 260—667 |
| 3,471,583 | 10/1969 | Fleming | 260—683.9X |

DANIEL E. WYMAN, Primary Examiner

C. F. DEES, Assistant Examiner

U.S. Cl. X.R.

252—459, 466R; 260—683.9